(12) United States Patent
Haubennestel et al.

(10) Patent No.: US 8,512,465 B2
(45) Date of Patent: Aug. 20, 2013

(54) USE OF COPOLYMERS AS ADHESION PROMOTERS IN LACQUERS

(75) Inventors: Karlheinz Haubennestel, Wesel (DE); Stefan Mossmer, Wesel (DE); Thomas Launag, Voerde (DE); Albert Frank, Xanten (DE)

(73) Assignee: BYK-Chemie GmbH (DE)

( * ) Notice: Subject to any disclaimer, the term of this patent is extended or adjusted under 35 U.S.C. 154(b) by 404 days.

(21) Appl. No.: 12/227,070

(22) PCT Filed: May 4, 2007

(86) PCT No.: PCT/EP2007/003941
§ 371 (c)(1),
(2), (4) Date: Feb. 19, 2009

(87) PCT Pub. No.: WO2007/128510
PCT Pub. Date: Nov. 15, 2007

(65) Prior Publication Data
US 2010/0029838 A1 Feb. 4, 2010

(30) Foreign Application Priority Data
May 6, 2006 (DE) .......... 10 2006 021 200

(51) Int. Cl.
*C08F 26/06* (2006.01)
*C08F 126/06* (2006.01)
*C08F 226/06* (2006.01)
*C04B 14/00* (2006.01)
*C09B 67/00* (2006.01)

(52) U.S. Cl.
USPC ............ 106/287.21; 106/401; 526/258

(58) Field of Classification Search
USPC ............ 526/258; 106/401, 287.21
See application file for complete search history.

(56) References Cited

U.S. PATENT DOCUMENTS

| | | | |
|---|---|---|---|
| 2,881,171 | A | 4/1959 | Hankins |
| 2,980,562 | A | 4/1961 | Matter et al. |
| 3,366,613 | A | 1/1968 | Kelly |
| 3,369,008 | A | 2/1968 | Hurwitz |
| 3,509,085 | A | 4/1970 | Sekmakas |
| 4,104,227 | A | 8/1978 | Boessler et al. |
| 4,219,454 | A | 8/1980 | Daniels et al. |
| 5,130,463 | A | 7/1992 | Haubennestel et al. |
| 5,244,979 | A * | 9/1993 | Yamamoto et al. ........ 525/329.7 |
| 5,310,813 | A | 5/1994 | Nagasawa et al. |
| 5,635,169 | A * | 6/1997 | Blankenburg et al. ..... 424/70.15 |
| 5,770,646 | A | 6/1998 | Antonelli et al. |
| 6,025,317 | A * | 2/2000 | Stein et al. ................... 510/360 |
| 6,040,385 | A | 3/2000 | Van De Berg et al. |
| 6,096,899 | A * | 8/2000 | Rasmussen et al. ........ 548/312.7 |
| 6,153,705 | A | 11/2000 | Copart et al. |
| 6,291,620 | B1 | 9/2001 | Moad et al. |
| 6,316,564 | B1 * | 11/2001 | Huybrechts et al. .......... 526/261 |
| 6,362,274 | B1 | 3/2002 | Legrand et al. |
| 6,552,142 | B1 * | 4/2003 | Meffert et al. ................ 526/264 |
| 6,593,399 | B1 * | 7/2003 | La Fleur et al. .............. 523/201 |
| 7,479,514 | B2 * | 1/2009 | Tye .............................. 524/174 |
| 2002/0028952 | A1 * | 3/2002 | Rasmussen et al. ........ 548/334.1 |
| 2002/0137865 | A1 * | 9/2002 | Haubennestel et al. ...... 526/258 |
| 2003/0096931 | A1 * | 5/2003 | Paul et al. .................... 526/258 |
| 2003/0119982 | A1 * | 6/2003 | Pinschmidt et al. .......... 524/801 |
| 2006/0128916 | A1 * | 6/2006 | Schrod ......................... 526/258 |
| 2008/0115695 | A1 * | 5/2008 | Sujeeth et al. ............... 106/473 |
| 2010/0004359 | A1 * | 1/2010 | Wang et al. .................. 524/27 |

FOREIGN PATENT DOCUMENTS

| | | |
|---|---|---|
| CA | 2399446 | 8/2001 |
| DE | 2529732 | 1/1977 |
| DE | 10005113 | 8/2001 |
| DE | 10107384 | 9/2002 |
| EP | 0056441 A2 | 7/1982 |
| EP | 0171850 A1 | 2/1986 |
| EP | 0417490 A2 | 3/1991 |
| EP | 0658574 A1 | 6/1995 |
| EP | 0928820 A2 | 7/1999 |
| JP | 63154776 A * | 6/1988 |
| WO | WO-97/28200 A1 | 8/1997 |
| WO | WO-98/01478 A1 | 1/1998 |
| WO | WO-98/58974 A1 | 12/1998 |
| WO | WO-99/31144 A1 | 6/1999 |
| WO | WO-2004/081128 A2 | 9/2004 |

OTHER PUBLICATIONS

Machine Translation of EP 0056441, 2011.*
Translation of JP 63154776, 2011.*
"International Application No. PCT/EP2007/003941, English Translation of International Preliminary Report on Patentability issued Dec. 10, 2008", (Dec. 10, 2008), 6 pgs.
"International Application No. PCT/EP2007/003941, International Search Report mailed Dec. 20, 2007", (w/ English Translation), 6 pgs.
Hawker, C.J., et al., "New Polymer Synthesis by Nitroxide Mediated Living Padical Polymerization", *Chemical Reviews*, vol. 101, (2001), 3661-3688.
Matyjaszewski, K., "Atom Transfer Radical Polymerization", *Chemical Reviews*, vol. 101, (2001), 2921-2990.

(Continued)

*Primary Examiner* — Liam Heincer
(74) *Attorney, Agent, or Firm* — Schwegman Lundberg & Woessner, P.A.

(57) ABSTRACT

The invention relates to the use of copolymers which as well as other monomers contain in copolymerized form 10% to 90% by weight of monomers containing heterocyclic basic groups, and which do not contain vinylpyrrolidone as a monomer component, as additives in paints for improving the adhesion of the solid paint film to a substrate.

The invention also relates to cured and uncured polymer compositions comprising copolymers which as well as other monomers contain in copolymerized form 10% to 90% by weight of monomers containing heterocyclic basic groups, and which do not contain vinylpyrrolidone as a monomer component, as adhesion improver additions.

10 Claims, No Drawings

(56) References Cited

OTHER PUBLICATIONS

Moad, G., et al., "Living free radical polymerization with reversable addition—fragmentation chain transfer (the life of RAFT)", *Ploymer International*, 49, (2000), 993-1001.

Moad, G., et al., "Living Radical Polymerization by the RAFT Process", *Aust. J. Chem.*, 58, (2005), 379-410.

Perrier, S., et al., "Macromolecular Design via Reversible Addition—Fragmentation Chain Transfer (RAFT)/Xanthates (MADIX) Polymerization", *Journal of Polymer Science: Part A: Polymer Chemistry*, vol. 43, (2005), 5347-5393.

Wieland, P. C., et al., "A New Additive for Controlled Radical Polymerization", *Macromolecular Rapid Communications*, 22(9), (2001), 700-703.

* cited by examiner

USE OF COPOLYMERS AS ADHESION PROMOTERS IN LACQUERS

RELATED APPLICATIONS

This application is a U.S. National Stage filing under 35 U.S.C. §371 from International Application No. PCT/EP2007/003941 filed May 4, 2007, and published in German as WO 2007/128510 A2, which claims priority from German Application No. 10 2006 021 200.2, filed May 6, 2006, which applications and publication are incorporated herein by reference in their entirety and made a part hereof.

The present invention relates to the use of copolymers which as well as other monomers contain in copolymerized form 10% to 90% by weight of monomers containing heterocyclic basic groups, and which do not contain vinylpyrrolidone as a monomer component, as additives in paints for improving the adhesion of the solid paint film to a substrate. The term "solid paint film" encompasses all kinds of physically or chemically cured coating layers.

Paints and coatings serve decorative purposes and also serve to protect the substrate from harmful effects. In order to be able to exert this function, it is extremely important that these coatings also adhere to the substrate to which they are applied by the customary measures, such as spraying, rolling, dipping, etc.

Poor adhesion is also known for solvent-borne paints in certain cases, but not with such serious significance as in the case of aqueous paint systems, including more particularly in aqueous emulsion paints. These aqueous emulsion paints, based for example on acrylate, methacrylate, vinyl ester, vinyl ester-acrylate and styrene-acrylate emulsion polymers and on alkyd resin emulsions, are being used more and more nowadays, because they are very eco-friendly and contain only small amounts or none at all of volatile organic constituents such as solvents, for example.

There are a series of patents which indicate attempts at solving this problem of adhesion to different substrates.

In particular, emulsion polymers are described which contain in copolymerized form adhesion improver monomers. Although this proposed solution does result in improved adhesion, it forces the manufacturer of the coatings or paints to use these expensive emulsion polymers as binders. These proposals are based substantially on the use of cyclic urea products, which are used at the actual copolymerization stage, as comonomers, an example being methacryloyloxyethyl-ethyleneurea. They are described in U.S. Pat. Nos. 3,369,008; 3,366,613; 2,881,171; 3,509,085; 2,980,562 and 4,219,454.

EP 0 928 820 describes this problem very clearly and proposes a solution intended to eliminate the problem, by the subsequent addition to the emulsion polymer, as additives, of products which comprise cyclic ureas, these additions likewise constituting emulsion polymers. This proposal does not solve the existing problem completely, and there continues to be a major lack of adhesion-improving additions to aqueous emulsion paint systems, especially for problem substrates, such as aged organic coatings based for example on filled and/or pigmented alkyd resins or acrylate resins, or substrates such as filled and/or fibre-reinforced thermoplastics, thermosets, elastomers such as, for example, polyethylene (PE), polypropylene (PP), polyvinyl chloride (PVC), polystyrene (PS), polycarbonate (PC), polymethyl methacrylate (PMMA), acrylonitrile-butadiene-styrene graft copolymer (ABS), polyamide (PA), polyoxymethylene (POM), unsaturated polyesters (UP), epoxy resins (EP), melamine resins (MF), phenolic resins (PF), polyurethane (PU), ethylene-propylene-diene elastomer (EPDM), and commercial blends of said plastics.

WO 2004/081128 describes nitrogen-containing polymers for the surface treatment of metals. This process requires intensive pretreatment of the metals, including a thin coating with aqueous solutions of the nitrogen-containing polymers. Thereafter the adhesion of coatings to the metal thus pretreated is said to be improved. This process is essentially one of passivation of the metals to be coated; a secondary effect is the better adhesion of paint layers, to be applied if appropriate, to the passivated surfaces.

DE 100 05 113 A1 describes a process for the corrosion control treatment of metal surfaces which is characterized in that the metal surface is contacted with a homopolymer or copolymer of vinylpyrrolidone. Here again, the improvement in the adhesion of any organic coating, for subsequent application if appropriate, to the passivated metal surface is only a secondary effect; the primary focus is on the corrosion control effect of homopolymers or copolymers of vinylpyrrolidone on metal substrates.

The BASF brochure "PVP and more" describes copolymers of vinylpyrrolidone and vinylimidazole as adhesion promoters in corrosion control.

DE 101 07 384 A1 describes these polyvinylpyrrolidone homopolymers and/or copolymers as electrically conductive adhesion promoters for electrodes.

From EP 0 658 574 it is known that amidoamines, imidoamines and esteramines based on copolymers of monounsaturated carboxylic acids or their derivatives and ethylenically unsaturated compounds, such as α-olefins, and polyamines are effective as adhesion promoters in predominantly PVC plastisols.

These described polymers have long aliphatic, hydrophobic side chains and are only effective in relatively a polar systems, as represented by plastisols. Such plastisols are generally baked only at temperatures of 120° C. to 200° C. Application at room temperature is not possible.

EP 0 171 650 describes likewise adhesion-improving additions to PVC plastisols on the basis of polyaminoamides of unsaturated polycarboxylic acids, essentially dimerized and trimerized fatty acids, and piperazine derivatives. These compounds too are very hydrophobic and, accordingly, are effective only in apolar systems which are baked at temperatures not below 120° C.

The proposals described in the cited patents have the disadvantage that, on the one hand, the substrates to be coated, primarily metal surfaces, must be pretreated in order to achieve an improvement in adhesion of a paint coat for subsequent application, or that, on the other hand, the inventive polymers all contain polyvinylpyrrolidone, which in the case of (co)polymerization is used in the form of its toxic monomer.

Surprisingly it has been found that copolymers having heterocyclic basic groups, preferably imidazole groups, in the molecule, and which do not contain polyvinylpyrrolidone, are able to solve this problem if they are added directly as adhesion-improving compounds to the paint system. This means, in contrast to the prior art, that an improvement in the adhesion of a paint system to a substrate is achieved through the addition of very small amounts of the copolymers, without it being necessary for the substrate to be pretreated by the application of a passivating layer and without it being necessary to use any toxic vinylpyrrolidone monomer for the copolymerization of the adhesion-improving compounds of the invention. The presence of polyvinylpyrrolidone, however, is prescribed as mandatory in Patents DE 100 05 113 A1 and DE 101 07 384 A1. The copolymers for use in accordance with the invention contain 10%-90% by weight, preferably 20%-80% by weight and with particular preference 40%-70% by weight of monomers containing heterocyclic basic groups, alongside other monomers such as, for example, (meth) acrylic esters, aromatic vinyl compounds, vinyl esters, itaconic esters, maleic anhydride, maleic esters, vinyl ethers and other vinyl compounds, with the exception of vinylpyrrolidone. In the case of the (meth)acrylic esters it is possible to use compounds which are prepared by esterifying (meth) acrylic acid with different alcohols, such as linear and branched alcohols having a chain length of C1-C4, cyclic, substituted and unsubstituted alcohols having 6-15 C atoms, examples being methyl(meth)acrylate, ethyl (meth)acrylate, n-butyl(meth)acrylate, isobutyl(meth)acrylate, tert-butyl (meth)acrylate, cyclohexyl(meth)acrylate, isobornyl(meth) acrylate or aryl(meth)acrylates such as benzyl methacrylate or phenyl acrylate, it being possible for the aryl radicals in each case to be unsubstituted or to be substituted up to four times, such as, for example, 4-nitrophenyl methacrylate. Hydroxyalkyl(meth)acrylates of linear, branched or cycloaliphatic diols having 2 to 36 C atoms, such as, for example, 3-hydroxypropyl methacrylate, 3,4-dihydroxybutyl monomethacrylate, 2-hydroxyethyl(meth)acrylate, 4-hydroxybutyl(meth)acrylate, 2-hydroxypropyl methacrylate, mono(meth)acrylates of ethers, polyethylene glycols, polypropylene glycols or mixed polyethylene/polypropylene glycols having 5 to 80 C atoms, such as, for example, tetrahydrofurfuryl methacrylate, methoxyethoxyethyl methacrylate, 1-butoxypropyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethyl methacrylate, 1-ethoxybutyl methacrylate, 1-ethoxyethyl methacrylate, ethoxymethyl methacrylate, poly(ethylene glycol)methyl ether(meth)acrylate, poly(propylene glycol)methyl ether(meth)acrylate; caprolactone- and/or valerolactone-modified hydroxyalkyl (meth)acrylates having an average molecular weight $M_n$ of 220 to 1200 g/mol, the hydroxy (meth)acrylates being derived preferably from linear, branched or cycloaliphatic diols having 2 to 8 C atoms, the last-mentioned products being available commercially in the form, for example, of Tone® M100 from DOW. The (meth)acrylic ester of hydroxyethylethyleneurea and the (meth)acrylamide of aminoethylethyleneurea are likewise suitable.

(Meth)acrylates of halogenated alcohols, such as perfluoroalkyl(meth)acrylates having 6 to 20 C atoms; oxiranyl (meth)acrylates, such as 2,3-epoxybutyl methacrylate, 3,4-epoxybutyl methacrylate and glycidyl (meth)acrylate, for example;

maleic esters such as diethyl maleate and dibutyl maleate, for example, these compounds being inexpensively available commercially, and unsaturated nitrile compounds such as methacrylonitrile and acrylonitrile, for example; maleimide, N-phenylmaleimide and N-substituted maleimides with linear or branched alkyl groups having 1 to 4 C atoms, such as N-ethylmaleimide and N-butyl-maleimide, for example;

(meth)acrylamide and N-alkyl- and N,N-dialkyl-substituted acrylamides with linear branched or cycloaliphatic alkyl groups having 1 to 4 C atoms, such as N-(tert-butyl)acrylamide and N,N-dimethylacrylamide, for example;

and silyl-containing (meth)acrylates, such as, for example, trimethylsilyl(meth)acrylate and 3-(trimethylsilyl)propyl methacrylate, find use as suitable monomers. Copolymerizable monomers containing heterocyclic basic groups are not preparable or available commercially without a relatively high degree of cost and inconvenience, and consequently, for the copolymers, it is essentially the readily available N-vinylimidazole or 2- and 4-vinylpyridine that are used.

The stated monomers can also be polymerized in mixtures together with N-vinylimidazole.

Preferred suitability among the aromatic vinyl compounds is possessed by styrene, α-methylstyrene, vinyltoluene or 5-vinyl-2-norbornene. In the case of the vinyl esters, vinyl acetate is particularly suitable, although vinyl crotonate can also be used. In the case of the vinyl ethers, ethyl vinyl ether and n-butyl vinyl ether are particularly suitable, although isobutyl vinyl ether, tert-butyl vinyl ether, cyclohexyl vinyl ether and 4-hydroxybutyl vinyl ether can also be used.

Other vinyl compounds suitable as comonomers are N-vinyl lactams such as N-vinylcaprolactam and N-vinylpiperidone, for example, but not the toxic vinylpyrrolidone, or vinyl heteroaromatics such as 2- and 4-vinylpyridine N-oxide. A prerequisite is that the monomers can be copolymerized with the co-employed comonomers and that the heterocyclic basic groups vital for the polymers of the invention can be incorporated in the specified amounts into the polymers by copolymerization.

As comonomers it is likewise possible to use macromonomers. These macromonomers can be prepared by known methods, as described for example in U.S. Pat. No. 5,770,646, U.S. Pat. No. 5,310,813, Russian Chemical Reviews, 56 (8), 1987 and XXIV International Conference in Organic Coatings, Jul. 6-10, 1998, Application of Graft Copolymers by Macromonomer method to 2-component polyurethane coatings (Kansai Paint Co. Ltd.).

Suitable for the preparation of the macromonomers are (meth)acrylic esters of linear or branched alcohols having preferably 1-4 C atoms, such as methyl(meth)acrylate, ethyl (meth)acrylate and n- and isobutyl(meth)acrylate. Additionally it is possible to use cycloaliphatic(meth)acrylates, such as cyclohexyl(meth)acrylate and isobornyl(meth)acrylate. Benzyl(meth)acrylate is likewise suitable. Examples of other suitable monomers include styrene, α-methylstyrene, acrylonitrile, and alkyl vinyl ethers, as already mentioned earlier on above. Use may also be made, however, of mixtures of these monomers.

In addition to the poly(meth)acrylates with a terminal (meth)acrylic function, however, other macromonomers are also suitable as comonomers. Preference is given to the mono-vinyl-terminated polydimethylsiloxanes which are obtained, for example, by reaction of monohydroxy-functional polysiloxanes (available from Shin Etsu, for example) with (meth)acrylic acid. These macromonomers have a number-average molecular weight (Mn) of 200 to 5000 g/mol and preferably from 500 to 100 g/mol.

To ensure that these macromonomers carry essentially only one single ethylenically unsaturated end group requires special synthesis methods. On the one hand they can be prepared using what are called chain transfer agents, as described in U.S. Pat. No. 5,770,646. This is done using cobalt complexes in concentrations of 5-1000 ppm. Preference is given, for example, to pentacyanocobaltate(II) or diaquabis(boron difluorodimethyl-phenylglyoximato)cobaltate(II). The corresponding Co(III) complexes find application equally. The polymerization can in this case be carried out in solvents such as aromatics, ketones, acetates, alcohols or glycol ethers, for example. Free-radical initiators that can be used are the peroxo and/or azo initiators that are known to the person skilled in the art. On the other hand these macromonomers can be prepared by free-radical polymerization in the presence of a mercapto-functional carboxylic acid as chain regulator, such as mercaptoacetic acid or mercaptopropionic acid, for example. This terminal carboxyl function is reacted further with glycidyl methacrylate to give the polymerizable macromonomer with methacrylic functionality.

Hydroxy-functional chain regulators, such as mercaptoethanol or mercaptopropanol, can likewise be employed. The polymers obtained using these agents then carry at one end a hydroxy function, which is further reacted with (meth)acryloyl chloride to give the polymerizable macromonomer with (meth)acrylic functionality.

The detailed preparation of the macromonomers is described in aforementioned patents. In the polymers of the invention these macromonomers are used preferably in amounts of 0.5%-15% by weight, with particular preference 2%-10% by weight.

Through the use of such macromonomers in the copolymers of the invention it is possible in a certain sense to prepare block structures, specifically by using different monomers/monomer mixtures in the parent polymer and in the macromer.

An accumulation of the heterocyclic basic groups in the polymer, as may be achieved using controlled polymerization processes in the form, for example, of block copolymers, may be advantageous in certain applications. Recent years have seen the development of various living, controlled polymerization processes suited to the preparation of block copolymers. These processes include, for example, Reversible Addition Fragmentation Chain Transfer (RAFT), which when using certain polymerization regulators is also called MADIX and Addition Fragmentation Chain Transfer, but will be referred to here only as RAFT. It is described for example in Polym. int. 2000, 49, 993, Aust. J. Chem. 2005, 58, 379, J. Polym. Sci. Part A: Polym. Chem. 2005, 43, 5347, U.S. Pat. No. 6,291,620, WO 98/01478, WO 98/58974 and WO 99/31144. The controlled polymerization with nitroxyl compounds as polymerization regulators (NMP) is disclosed for example in Chem. Rev. 2001, 101, 3661. Atom Transfer Radical Polymerization (ATRP) is described for example in Chem. Rev. 2001, 101, 2921. Group Transfer Polymerization (GTP) is disclosed for example by O. W. Webster in "Group Transfer Polymerization" in "Encyclopedia of Polymer Science and Engineering", volume 7, H. F. Mark, N. M. Bikales, C. G. Overberger and G. Menges, Eds., Wiley Interscience, New York 1987, page 580 ff. The controlled free-radical polymerization with tetraphenylethane is described for example in Macromol. symp. 1996, 111, 63; the controlled free-radical polymerization with 1,1-diphenylethene as polymerization regulator, for example, in Macromolecular Rapid Communications, 2001, 22, 700. The controlled free-radical polymerization with iniferters is disclosed for example in Makromol. Chem. Rapid. Commun. 1982, 3, 127, and the controlled free-radical polymerization with organocobalt complexes is known for example from J. Am. Chem. Soc. 1994, 116, 7973.

The number-average molecular weights (Mn) of the polymers of the invention are situated preferably in the range of 1000-50 000 g/mol, more preferably 2000-25 000 g/mol, very preferably in the range of 3000-15 000 g/mol. The number-average molecular weight (Mn) can be determined by means of gel permeation chromatography using polymethyl methacrylate standards.

The heterocyclic basic groups of the branched polymers of the invention can also be salified. Salt-forming components used are monocarboxylic acids such as acetic acid, propionic acid, stearic acid or oleic acid, hydroxycarboxylic acids such as ricinoleic fatty acid, hydroxystearic acid, sulphonic acids of the general formula $HOSO_2R^1$, sulphuric esters of the general formula $HOSO_2R^1$, polyoxyalkylene glycol monoalkyl ethers, mono/di-phosphoric eaters and phosphoric esters of the general formula $(OH)_{3-n}PO(OR^2)_n$ with n=1 or 2, of the kind described in EP 0 417 490, and also inorganic acids such as phosphoric acid, for example. The radicals $R^1$ and $R^2$ are characterized in that they contain at least one alkyl, aryl and/or aralkyl radical having more than 5 carbon atoms and/or a carboxylic ester function (—COO—) and/or a urethane group (—NHCOO—).

The salt-forming component may also at least in part be incorporated by copolymerization during the actual copolymerization, in the form for example of (meth)acrylic acid. Examples of other copolymerizable acids include crotonic acid, allylacetic acid and vinylacetic acid. Additionally suitable are monoethylenically unsaturated dicarboxylic acids, such as maleic acid, fumaric acid, itaconic acid and maleic anhydride. In addition it is possible to use monomers containing sulphonic acid groups, such as vinylsulphonic acid, allylsulphonic acid and 2-acrylamido-2-methylpropanesulphonic acid, and also monomers containing phosphonic acid groups, such as vinylphosphonic acid. The acids can be used either alone or as mixtures. The acid-containing monomers are employed in amounts between 1%-5%, preferably between 1%-3%, based on the total monomer fraction. Where the polymerization takes place in an aqueous medium, the acid-containing monomers can also be used in the form of salts, such as in the form of the sodium salt or potassium salt, for example.

One preferred embodiment comprises copolymerizing N-vinylimidazole free-radically with the stated copolymers in a suitable solvent which does not have a disruptive effect in the course of the subsequent application.

The polymers of the invention are prepared in a way which is known to the person skilled in the art, preferably by means of free-radical polymerization in organic solvents using free-radical initiators, such as peroxides or azo compounds, for example.

Suitable solvents are esters such as ethyl acetate, n-butyl acetate or 1-methoxy-2-propyl acetate, and also alcohols such as ethanol, isopropanol, n-butanol or 1-methoxy-2-propanol, and glycol ethers such as 2-ethoxyethanol, 2-propoxyethanol, 2-butoxyethanol, 2-(2-ethoxyethoxy)ethanol or 2-(2-butoxyethoxy)ethanol. It is also possible to use aromatic solvents, such as toluene, xylene or higher-boiling alkylbenzenes, for example. Also conceivable is the use of other solvents or the use of solvent mixtures, the choice of solvent or solvents being guided by the intended use of the copolymer of the invention. Preference is given to using esters and glycol ethers, and particular preference is given to Texanol® (2,2,4-trimethyl-pentane-1,3-diol monoisobutyrate), 1-methoxy-2-propyl acetate and 2-butoxyethanol.

For the copolymerization it is possible to use the typical peroxidic initiators such as, for example, tert-butyl peroxobenzoate or dibenzoyl peroxide or azo initiators such as, for example, azoisobutyronitrile (AIBN) or, preferably, 2,2'-azo-bis(2-methylbutyronitrile) (AMBN). It is also possible, as known to the person skilled in the art, to use chain terminators such as dodecyl mercaptan, mercaptoethanol or other thiols, for example, in order to control the molecular weight in the desired way.

The polymerization is carried out at temperatures of approximately 60° C. to 180° C., preferably at 70° C. to 150° C., more preferably at 75° C. to 130° C.

The polymerization can also be carried out in bulk if solvents are unwanted, or the solvents that are used in the polymerization, such as alcohols, esters, glycol ethers and ketones, such as ethanol, butyl acetate, ethyl acetate, Texanol®, butyl glycol, propylene glycol monomethyl ether, diisobutyl ketone and methyl ethyl ketone, are distilled off in whole or in part after the polymerization, and the polymer is taken up in a suitable carrier medium appropriate for aqueous emulsion paints. Suitability for this purpose is possessed for example by esters, glycol ethers, alcohols such as Texanol®, 2-butoxyethanol or ethanol/water and/or glycol ethers of higher molecular weight, which are not classed as volatile organic solvents (VOCs).

The comonomers that are used in the copolymerization are guided by the subsequent field of application of the polymers. Thus it is sensible to select the monomer composition so as to obtain high compatibility in the emulsion polymer and likewise a certain affinity with the substrate to be coated. Where, for example, the intention is to improve the adhesion of a hydrophilic paint system to a substrate, the comonomers used are preferably hydrophilic monomers such as, for example, polyethylene glycol monomethyl ether methacrylate 400 (the number indicates the approximate molecular weight) alongside N-vinylimidazole. Hydrophilic monomers possess a solubility parameter of greater than or equal is to 22 $J^{1/2}/cm^{3/2}$, while hydrophobic monomers possess a solubility parameter of less than $J^{1/2}/cm^{3/2}$ (division according to WO 97/28200).

Where the polymers of the invention are not prepared by direct synthesis, as described, the heterocyclic basic group can also be introduced into the polymer by means of polymer-analogous reaction.

Appropriate for this purpose are reactions which introduce the heterocyclic basic group, by means for example of ring-opening amidation, into a polymer containing carboxylic anhydride groups. This reaction, if carried out by means of a heterocyclic basic group that carries a primary amine group, such as aminopropylimidazole, for example, can also be taken further to the imide stage. Examples of base polymers appropriate for carrying out a polymer-analogous reaction of this kind include styrene-maleic anhydride (MAn) copolymers, which are available commercially in different molecular weights and styrene/MAn ratios. Besides the commercially customary styrene/MAn copolymers, there are other alkene/MAn copolymers available too, such as ethylene/MAn or octene/MAn copolymers, for example; additionally, however, vinyl ether/MAn copolymers are obtainable and can be employed as base polymers for further reactions with basic substituents containing heterocyclic groups. These and similar reactions can also be carried out under esterifying conditions if, for example, hydroxyethyl-imidazole is used in the ring opening.

It is also possible to use poly(meth)acrylates, preferably poly(alkyl acrylates), more preferably poly(n-butyl acrylates) and copolymers thereof as base polymers with molecular weights between 1000 and 20 000 g/mol, preferably 2000 and 10 000 g/mol and more preferably between 3000 and 7500 g/mol, the basic compounds containing heterocyclic groups, such as hydroxyethylimidazole or aminopropylimidazole, for example, being introduced into the polymer by means of transesterification or transamidation with release of alkanols, preferably n-butanol. These transesterifications or transamidations can be carried out in accordance with conventional methods using typical catalysts such as tetraisopropyl titanate or para-toluenesulphonic acid (PTS), for example, as described in Patent DE 197 21 728, or else by means of enzymatic reaction, as described in Patent DE 198 50 507.

Base polymers containing epoxy groups as well can be reacted in a ring-opening reaction with compounds containing heterocyclic basic groups containing primary or secondary amino groups.

Since these compounds are not available ad infinitum, it is also possible, for example, to prepare hydroxy-functional derivatives, by means, for example, of reacting hydroxyalkyl acrylates in a Michael addition reaction with, for example, aminopropylimidazole. Further such reactive compounds can be prepared in a simple way by reacting heterocyclic basic compounds, such as imidazole, 2-methylimidazole, 2-ethylimidazole, 4-methylimidazole, 2-ethyl-4-methylimidazole, pyrazole, N-methylpiperazine, N-ethylpiperazine, and N-(2-aminoethyl)morpholine with, for example, hydroxyethyl acrylate in a Michael addition to give the corresponding hydroxy compounds. This reaction obeys, by way of example, the following mechanism:

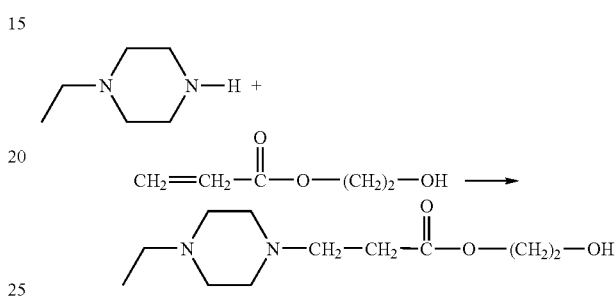

Depending on the hydroxy-containing acrylate used, it is also possible by this means to prepare very polar versions, by using, for example, alkoxylated hydroxyalkyl acrylates for the Michael addition and then reacting these intermediates further with the OH-reactive base polymer.

In the course of the ring-opening amidation, imidation or esterification, the primary products are free carboxylic acids, which can easily react with the basic, heterocyclic compounds, with intermolecular or intramolecular salt formation, to form compounds of sparing solubility or no solubility. Remedy may be provided here by tertiary amines, which in the reaction are added in an equimolar proportion and which scavenge the free carboxyl groups, forming salts in the process.

In one preferred embodiment, MAn copolymers are reacted with aminopropylimidazole, where appropriate with the assistance of catalysts such as para-toluenesulphonic acid, for example, to form amide- and/or imide-containing polymers. The molecular weights of the MAn copolymers are between 1000 and 10 000 g/mol, preferably between 2000 and 5000 g/mol. These polymer-analogous reactions can be carried out solventlessly or in aprotic solvents such as ethyl acetate, butyl acetate, PMA or aromatics such as xylene, for example. Depending on the field of application, the solvents used for the synthesis can remain in the reaction mixture or are wholly or partly removed and replaced where appropriate by other solvents or carrier media. The solvent may be removed in whole or in part by means for example of distillation, where appropriate under reduced pressure and/or azeotropically with addition of water. The active substance obtained by one of these methods can then be diluted in a solvent suitable for the particular field of use.

In one further preferred embodiment, compounds containing heterocyclic basic moieties are reacted with acrylates to form. Michael adducts, which are then subjected in a further step to addition reaction with MAn copolymers, with the formation of ester moieties.

The present invention relates to the use of the copolymers containing heterocyclic basic groups, preferably imidazole groups, as adhesion improver additions to preferably aqueous emulsion paint systems, especially for problem substrates, such as aged organic coatings based for example on filled and/or pigmented alkyd resins and acrylate resins, or substrates such as filled and/or fibre-reinforced thermoplastics, thermosets, elastomers such as, for example, polyethylene (PE), polypropylene (PP), polyvinyl chloride (PVC), polystyrene (PS), polycarbonate (PC), polymethyl methacrylate (PMMA), acrylonitrile-butadiene-styrene graft copolymer (ABS), polyamide (PA), polyoxymethylene (POM), unsaturated polyesters (UP), epoxy resins (EP), melamine resins (MF), phenolic resins (PP), polyurethanes (PU), ethylene-propylenediene elastomers (EPDM), and commercial blends of said plastics.

It is not subject matter of this invention to use the polymers of the invention on uncoated metals or as a corrosion-inhibiting coat on bare metal surfaces.

The amount in which the copolymers of the invention containing heterocyclic basic groups, preferably imidazole groups, are used as adhesion improver additions to preferably aqueous emulsion paint systems is preferably 0.05% to 5.0% by weight active substance, more preferably 0.1% to 3.0% by weight active substance, and very preferably 0.2% to 2.0% by weight active substance, based on the weight of the overall formulation.

Further provided by the invention are cured and uncured polymer compositions comprising one or more of the copolymers containing heterocyclic basic groups, preferably imidazole groups, as adhesion improver additions.

The invention is elucidated in more detail below with reference to working examples.

PREPARATION EXAMPLES

Example 1

A 1 litre 3-neck flask with stirrer, reflux condenser and thermometer is charged at room temperature with 100 g of N-vinylcaprolactam and 270.6 g of PM and this initial charge is heated to 125° C. under a nitrogen atmosphere. Metered into this solution is a mixture of 25 g of N-vinylimidazole and 25 g of PM simultaneously with 6.48 g of Trigonox® CM 50 (tert-butyl peroxobenzoate, 50% in mineral oil, from Akzo Nobel) as a polymerization initiator over a period of 60 minutes. Two hours after the end of the addition of monomer, 0.32 g of Trigonox® CM 50 is added and the mixture is stirred at 125° C. for 3 hours more. The product possesses a solids content of 30%.

Example 2

A 1 litre 3-neck flask with stirrer, reflux condenser and thermometer is charged at room temperature with 250 g of butyl glycol and this initial charge is heated to 125° C. under a nitrogen atmosphere. Metered into this solution is a mixture of 65.0 g of N-vinylcaprolactam, 73.2 g of N-vinylimidazole, 8.1 g of hydroxyethyl methacrylate and 95 g of butyl glycol simultaneously with 3.3 g of Trigonox CM 50 in S g of butyl glycol over a period of 150 minutes. Two hours after the end of the addition of monomer, 0.4 g of Trigonox CM 50 is added and the mixture is stirred at 125° C. for 3 hours more. The product possesses a solids content of 30%.

Examples 3-6 are prepared in the same way as in Example 2:

| Ex. | Monomer 1 | Monomer 2 | Monomer 3 | Ratio 1:2:3 | Solvent | Solids content [%] |
|---|---|---|---|---|---|---|
| 3 | N-vinyl-imidazole | isobornyl methacrylate | — | 40:60 | BG/PM (1:1) | 40 |
| 4 | N-vinyl-imidazole | PEG-MA 400 | — | 50:50 | BG | 30 |
| 5 | N-vinyl-imidazole | Tone ™ M 100 | acrylic acid | 60:37:3 | PM | 30 |
| 6 | N-vinyl-imidazole | n-butyl acrylate | Makromer AB 6 | 55:40:5 | BG | 30 |

PEG-MA 400: polyethylene glycol monomethyl ether methacrylate 400 (the number indicates the approximate molecular weight)

Tone™ 100: adduct of hydroxyethyl acrylate with 2 mol of ε-caprolactone, DOW Chemicals Makromer AS 6: butyl acrylate macromer, $M_n$=6000 g/mol

Example 7

A 1 litre 3-neck flask with stirrer, reflux condenser and thermometer is charged at room temperature with 260 g of ethanol and this initial charge is taken to boiling under a nitrogen atmosphere. Under reflux, a mixture of 102.5 g of N-vinylimidazole, 29.3 g of N-vinylcaprolactam, 14.6 g of polyethylene glycol monomethyl methacrylate 350 (the number indicates the approximate molecular weight) and 75 g of ethanol are metered in simultaneously with 1.9 g of 2,2'-azobis(2-methylbutyronitrile) in 10 g of ethanol over a period of 120 minutes. Three hours after the end of the monomer addition, 0.2 g of 2,2'-azobis(2-methylbutyronitrile) in 6.4 g of ethanol is added and the mixture is stirred under reflux for a further 3 hours. The product possesses a solids content of 30%.

Examples 8-10 are prepared in the same way as in Example 7:

| Ex. | Monomer 1 | Monomer 2 | Monomer 3 | Ratio 1:2:3 | Solvent | Solids content [%] |
|---|---|---|---|---|---|---|
| 8 | N-vinyl-imidazole | isobornyl methacrylate | — | 70:30 | ethanol | 30 |
| 9 | N-vinyl-imidazole | hydroxyethyl methacrylate | — | 75:25 | ethanol/iso-propanol 1:1 | 40 |
| 10 | N-vinyl-imidazole | n-butyl acrylate | Makromer AB 6 | 80:15:5 | ethanol | 30 |

Example 11

Reaction of SMA2000 with Aminopropylimidazole

A 250 ml 4-neck flask with stirrer, thermometer, distillation bridge and dropping funnel is charged at room temperature with 50 g of xylene and 36 g of aminopropylimidazole and this initial charge is heated to 135° C. under a nitrogen atmosphere. Added dropwise to this solution over about 30 minutes is a mixture of 25 g of SMA2000 resin (copolymer of styrene and maleic anhydride, pyridine acid number=320, Sartomer) and 25 g of butyl acetate. A milky white dispersion is formed over the course of an hour the temperature is raised to 180° C. and the solvents are partially removed by distillation. At about the time the temperature of 180° C. is reached, the solution becomes clear. The reaction mixture is held at 180° C. for three hours. Subsequent NMR analysis shows the presence of both amide structures and imide structures. The remaining solvents are subsequently removed at 180° C. under reduced pressure, and Texanol is subsequently added to set a solids content of 30%.

Example 12

Reaction of SMA4000 with Aminopropylimidazole

A 250 ml 4-neck flask with stirrer, thermometer, water separator with reflux condenser, and dropping funnel is charged at room temperature with 75 g of SA4000 resin (copolymer of styrene and maleic anhydride, pyridine acid number=211, Sartomer), 75 g of xylene and 0.5 g of p-toluenesulphonic acid and this initial charge is heated to 135° C. under a nitrogen atmosphere. At 135° C. the resulting solution is clear. When the temperature of 135° C. in reached, the metered addition of 70.6 g of aminopropylimidazole is commenced. Within a metering time of three hours and an after-reaction time of two hours, approximately 5 g of water are removed in circulation. Subsequent NMR analysis shows that as well as imide structures there are also amide structures present. The temperature is raised to 180° C. and volatile constituents are removed under reduced pressure. Butyl glycol is added subsequently to set a solids content of 30%.

Example 13

Reaction of Hydroxyethyl Acrylate with Aminopropylimidazole

A 250 ml 4-neck flask with stirrer, thermometer, reflux condenser and dropping funnel is charged at room temperature with 38.71 g of hydroxyethyl acrylate. Then, under a nitrogen atmosphere, 41.72 g of aminopropylimidazole are added dropwise over about 30 minutes. The reaction is strongly exothermic, and as a result of the exothermic heat a reaction temperature of 70° C. is attained. Following complete addition of the aminopropylimidazole, the temperature is held at 70° C. for a further two hours. NMR analysis thereafter shows a virtually quantitative reaction to give the desired Michael adduct. A clear yellow oil is obtained.

Reaction of SMA4000 with the Adduct of HEA and Aminopropylimidazole:

A 250 ml 4-neck flask with stirrer, thermometer, water separator with reflux condenser, and dropping funnel is charged at room temperature with 38.6 g of SMA4000 resin (copolymer of styrene and maleic anhydride, pyridine acid number=211, Sartomer), 38.6 g of xylene and 0.5 g of p-toluenesulphonic acid and this initial charge is heated to 135° C. under a nitrogen atmosphere. At 135° C. the resulting solution is clear when the temperature of 135° C. is reached, 70 g of the adduct of aminopropylimidazole and hydroxyethyl acrylate are metered in over the course of an hour. The temperature is raised to 180° C. and volatile constituents are removed under reduced pressure. The reaction mixture is held at 180° C. for three hours. Subsequent NMR analysis shows the presence of ester structures. Texanol is added subsequently to set a solids content of 30%.

Example 14

Reaction of Hydroxypropyl Acrylate with Pyrazole

A 250 ml 4-neck flask with stirrer, thermometer and reflux condenser is charged at room temperature with 70 g of hydroxypropyl acrylate (HPA). Then, under a nitrogen atmosphere, 36.6 g of solid pyrazole are added in portions over 15 minutes. In the course of this addition, the temperature falls to 7° C. Thereafter the batch is heated to 80° C. and stirred at that temperature for ten hours. A clear orange oil is obtained.

Reaction of SMA2000 with the adduct of HPA and pyrazole A 250 ml 4-neck flask with stirrer, thermometer, reflux condenser and dropping funnel is charged at room temperature with 30 g of butyl acetate and 56.5 g of the adduct of hydroxypropyl acrylate and pyrazole and this initial charge is heated to 135° C. under a nitrogen atmosphere. Added dropwise to this solution over about 30 minutes is a mixture of 25 g of SMA2000 resin (copolymer of styrene and maleic anhydride, pyridine acid number=320, Sartomer) and 25 g of butyl acetate. Over the course of an hour the temperature is raised to 180° C. and the solvents are partially removed by distillation. The reaction mixture is held at 180° C. for three hours. Subsequent NMR analysis shows the presence of ester structures. The residual solvents are subsequently removed at 180° C. under reduced pressure, and butyl glycol is added subsequently to set a solids content of 30%.

Example 15

Not Inventive

A 1 litre 3-neck flask with stirrer, reflux condenser and thermometer is charged at room temperature with 180 g of ethanol and this initial charge is taken to boiling under a nitrogen atmosphere. Under reflux, a mixture of 36 g of polyethylene glycol monomethyl ether methacrylate 400, 24 g of butyl acrylate, 60 g of 1-[2-(methacryloyloxy)ethyl]-2-imidazolidinone and 92.5 g of ethanol is metered in simultaneously with 2.9 g of Trigonox® 25-C7S (tert-butyl peroxopivalate, 75% in mineral oil, from Akzo Nobel) in 10 g of ethanol over a period of 120 minutes. Two hours after the end of the monomer addition, 0.3 g of Trigonox 25-C75 in 5 g of ethanol is added and the batch is stirred under reflux for a further 3 hours. The product has a solids content of 30%.

Use Examples

Adhesion of Emulsion Paints to Old Coats

The adhesiveness of coatings to old coatings was assessed by preparing a pigmented aqueous dispersion and, after 1 day of storage at RT, incorporating inventive compounds at low shear rates.

To produce the old coating, corresponding alkyd resin paint was applied by means of 150 µm wire doctor to steel panels, the paint was dried oxidatively at room temperature for 7 days, and the coating thus obtained was aged at 60° C. for 24 h.

Following application of the emulsion paint with inventive compounds, using a 100 µm box-section coating bar, to the coating aged as described above, the paint was conditioned by drying likewise at room temperature for 7 days and ageing at 60° C. for 24 h.

The corresponding adhesion of the new coating to the aged alkyd resin coating was determined in each case by means of a scratch test in accordance with DIN 53230.

Paint Formulas:

(Amounts Figures in Parts by Weight)

The paints were prepared by weighing out the weight fractions of raw materials as indicated in the tables below into a 100 ml double-walled Dispermat pot. An amount of glass beads 1 mm in diameter that is equal to the amount of raw material weighed out is added, and then dispersion is carried out using a 45 mm Teflon disc, with mains water cooling.

The dispersing time is 30 minutes at a peripheral speed (Teflon disc) of 23 m/s. After the paints have cooled, the remaining raw materials are incorporated with stirring.

The paints prepared in this way are sieved off on a paper sieve (mesh size 80 μm) and dispensed into glass bottles.

| Alkyd resin | | |
|---|---|---|
| Worleékyd S 365, 60%/Isopar H | 29.1 | long-oil alkyd resin/Worlée |
| Disperbyk 108 | 0.3 | wetting and dispersing additive/BYK-Chemie |
| Bentone 34, 10% in Isopar H | 1.9 | phyllosilicate/Rheox |
| Kronos 2310 | 26.2 | titanium dioxide/Kronos |
| Syloid ED 56 | 2.9 | matting agent/Grace |
| Dispermat CV: 30 min 8000 rpm (23 m/s), glass beads 1 mm 1:1 | | |
| Worleékyd S 365, 60% in Isopar H | 27.9 | |
| BYK 066 | 0.4 | defoamer/BYK-Chemie |
| Nuodex Combi APB | 2.3 | drier/Condea Servo |
| Isopar H | 8.6 | aliphatic hydrocarbon/ExxonMobil |
| Exkin 2 | 0.4 | anti-skinning agent/Condea Servo |
| Total | 100 | |

A1: Example 1
A2: Example 2
A3: Example 5
A4: Example 8
A5: Example 10
A6: Example 11
A7: Example 13
A8: Example 15

Raw Material Indications:

| | |
|---|---|
| Solvesso 100 | arom. HC C9-C10/ExxonMobil |
| BYK-151 | wetting and dispersing additive/BYK-Chemie |
| Proxel GXL | biocide/Avecia |
| Bentone LT | phyllosilicate/Rheox |
| BYK-034 | defoamer/BYK-Chemie |
| Natrosol H4BR | hydroxyethylcellulose/Aqualon |
| Al silicate P 820 | aluminium silicate/Degussa |
| Engl. Mica Glimmer P | mica |
| Alberdingk AC 545 | acrylic copolymer dispersion/Alberdingk Boley |

Results:

| Emulsion paint | Scratch test DIN 53230 |
|---|---|
| A1 | K2 |
| A2 | K1 |
| A3 | K2 |
| A4 | K2 |
| A5 | K1 |
| A6 | K3 |
| A7 | K3 |
| A8 | K5 |

The coatings produced with the inventive compounds show substantially higher adhesion values on an aged alkyd resin

| Emulsion paint | A1 | A2 | A3 | A4 | A5 | A6 | A7 | A8 |
|---|---|---|---|---|---|---|---|---|
| Water | 15.04 | 15.04 | 15.04 | 15.04 | 15.04 | 15.04 | 15.04 | 15.04 |
| BYK-151 | 0.40 | 0.40 | 0.40 | 0.40 | 0.40 | 0.40 | 0.40 | 0.40 |
| Proxel GXL | 0.20 | 0.20 | 0.20 | 0.20 | 0.20 | 0.20 | 0.20 | 0.20 |
| Bentone LT | 0.10 | 0.10 | 0.10 | 0.10 | 0.10 | 0.10 | 0.10 | 0.10 |
| BYK-034 | 0.30 | 0.30 | 0.30 | 0.30 | 0.30 | 0.30 | 0.30 | 0.30 |
| Natrosol H4BR | 0.16 | 0.16 | 0.16 | 0.16 | 0.16 | 0.16 | 0.16 | 0.16 |
| Aqueous ammonia, 33% | 0.30 | 0.30 | 0.30 | 0.30 | 0.30 | 0.30 | 0.30 | 0.30 |
| Butyl diglycol | 0.50 | 0.50 | 0.50 | 0.50 | 0.50 | 0.50 | 0.50 | 0.50 |
| Propylene glycol | 3.10 | 3.10 | 3.10 | 3.10 | 3.10 | 3.10 | 3.10 | 3.10 |
| Solvesso 100 | 0.20 | 0.20 | 0.20 | 0.20 | 0.20 | 0.20 | 0.20 | 0.20 |
| $TiO_2$ RKB-2 | 29.00 | 29.00 | 29.00 | 29.00 | 29.00 | 29.00 | 29.00 | 29.00 |
| Al silicate P 820 | 1.00 | 1.00 | 1.00 | 1.00 | 1.00 | 1.00 | 1.00 | 1.00 |
| Engl. Mica Glinmar P | 4.10 | 4.10 | 4.10 | 4.10 | 4.10 | 4.10 | 4.10 | 4.10 |
| Alberdingk AC 545 | 42.90 | 42.90 | 42.90 | 42.90 | 42.90 | 42.90 | 42.90 | 42.90 |
| Solvesso 100 | 1.00 | 1.00 | 1.00 | 1.00 | 1.00 | 1.00 | 1.00 | 1.00 |
| Diaparmat CV: 30 min 8000 rpm (23 m/s), glass beads 1 mm 1:1 (adhesion promoter according to Preparation Example) | 1.70 | 1.70 | 1.70 | 1.70 | 1.70 | 1.70 | 1.70 | 1.70 |
| Total | 100 | 100 | 100 | 100 | 100 | 100 | 100 | 100 | coating substrate in comparison to a coating without an inventive compound (A8) (K1=very good adhesion; K5=poor adhesion)

The invention claimed is:

1. A method for improving adhesion of a solid paint film to a substrate, wherein said substrate comprises an aged organic coating, comprising adding an additive to a paint, wherein the additive comprises copolymers comprising:
   (A) 15 to 40 wt % of at least one ethylenically unsaturated N-vinyl lactam monomer, with the exception of vinylpyrrolidone;
   (B) optionally 2 to 10 wt % of at least one ethylenically unsaturated macromonomer with a number average molecular weight (Mn) molecular weight of 200 to 5,000 and having a single ethylenically unsaturated end group; and
   (C) 10 to 80% wt % of at least one polymerisable imidazole derivative;
   wherein components (A), (B) when present, and (C), along with other monomeric components, make up 100 wt %;
   wherein the fraction of the additive in the paint is 0.05% to 5% by weight, based on the total weight of the paint including the additive; and
   coating the substrate comprising an aged organic coating with the paint and forming a solid paint film on the substrate.

2. The method of claim 1, wherein the polymerisable imidazole derivative comprises N-vinyl-imidazole.

3. The method of claim 1, wherein the copolymers are block copolymers.

4. The method of claim 1, wherein the number-average molecular weight of the copolymers is 1,000 to 50,000 g/mol.

5. The method of claim 1, wherein the copolymers are used in the form of their salts.

6. The method of claim 1, wherein the copolymers are used in aqueous emulsion paints.

7. The method of claim 1, wherein:
   optional component (B) is selected from macromonomers of methyl(meth)acrylate, ethyl(meth)acrylate and n- and isobutyl(meth)acrylate, cyclohexyl(meth)acrylate, isobornyl(meth)acrylate, benzyl(meth)acrylate, styrene, α-methylstyrene, acrylonitrile, alkyl vinyl ethers, mono-vinyl-terminated polydimethylsiloxanes, and mixtures thereof; and
   component (C) is N-vinyl-imidazole.

8. The method of claim 1 wherein the unsaturated N-vinyl lactammonomer is N-vinyl caprolactam and the polymerisable imidazole derivative in N-vinyl imidazole.

9. A method for improving adhesion of a solid paint film to a substrate, wherein said substrate comprises an aged organic coating, comprising adding an additive to a paint, wherein the additive comprises copolymers comprising:
   (A) 15-40 wt % of at least one N-vinyl lactam monomer with the exception of vinylpyrrolidone;
   (B) 2 to 10 wt % of at least one ethylenically unsaturated macromonomer with a number average molecular weight (Mn) molecular weight of 200 to 5,000 and having a single ethylenically unsaturated end group; and
   (C) 10-80 wt % of at least one polymerisable imidazole derivative;
   wherein components (A), (B) and (C), along with other monomeric components, make up 100 wt %;
   wherein the fraction of the additive in the paint is 0.05% to 5% by weight, based on the total weight of the paint including the additive; and
   coating the substrate comprising an aged organic coating with the paint and forming a solid paint film on the substrate.

10. The method of claim 9 wherein the unsaturated N-vinyl lactam monomer is N-vinyl caprolactam and the polymerisable imidazole derivative in N-vinyl imidazole.

* * * * *

UNITED STATES PATENT AND TRADEMARK OFFICE
CERTIFICATE OF CORRECTION

PATENT NO. : 8,512,465 B2  Page 1 of 1
APPLICATION NO. : 12/227070
DATED : August 20, 2013
INVENTOR(S) : Haubennestel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this
Fifteenth Day of September, 2015

Michelle K. Lee
*Director of the United States Patent and Trademark Office*